Oct. 12, 1954 R. URTEL 2,691,743

HORIZONTAL LINE REGISTRATION FOR PICKUP TUBES

Filed Jan. 26, 1950 2 Sheets-Sheet 1

INVENTOR
RUDOLPH URTEL
BY R P Morris
ATTORNEY

Oct. 12, 1954 R. URTEL 2,691,743

HORIZONTAL LINE REGISTRATION FOR PICKUP TUBES

Filed Jan. 26, 1950 2 Sheets-Sheet 2

INVENTOR
RUDOLPH URTEL
BY R.P. Morris
ATTORNEY

Patented Oct. 12, 1954

2,691,743

UNITED STATES PATENT OFFICE 2,691,743

HORIZONTAL LINE REGISTRATION FOR PICKUP TUBES

Rudolf Urtel, Pforzheim, Germany, assignor to International Standard Electric Corporation, New York, N. Y., a corporation of Delaware Application January 26, 1950, Serial No. 140,691

Claims priority, application Germany February 5, 1949

4 Claims. (Cl. 315—21)

Figure 1:
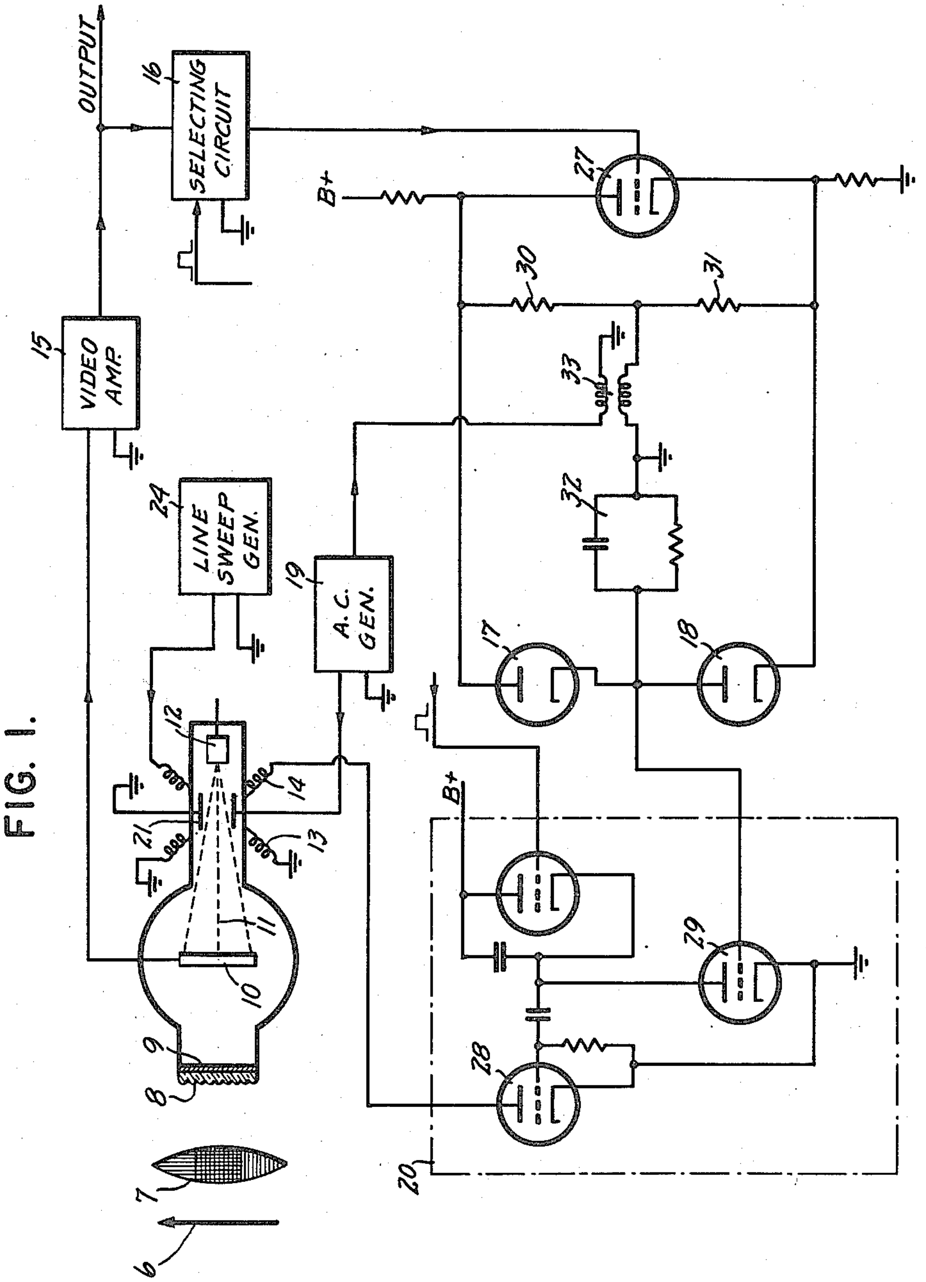

This invention relates to a method for stabilizing the location of the scanning lines in the lens-grating variety of color television.

In color television utilizing a lens-grating, the objective lens is subdivided in three differently colored sections (red, green, blue). In interaction with very small cylindric lenses of short focal length (lens-grating), arranged in scanning lines immediately in front of the target (mosaic screen), the object is so projected on the target that its colors are segregated within each scanning line into three color zones corresponding to the objective sections. Within each zone the respective color is registered as an intensity pattern. This intensity image on the target is scanned in the same way as a normal black-and-white picture.

In reproduction, the light travels the same path, but in the reverse direction, i. e., each of the three zones of each line appears as a black-and-white pattern of varying intensity, which by the lens-grating in front of the luminous screen are projected in correct distribution through the three differently-colored objective sections which confer the correct colors and superimpose the three zones optically, thus giving rise to the appearance of the colored image on the projecting screen.

If in this method the scanning lines shift off the center of the associated lenses, the division and addition of the respective color information becomes faulty. It is thus necessary to secure the exact location of the scanning lines. With the known methods, where the zones of a line, related to the three colors, are scanned in succession, this error is difficult to remedy and necessitates bulky equipment. The method suggested by this invention avoids this failure without the elaborate circuitry of the known methods, by the device that an R. F. oscillating motion, perpendicular to the line, is superposed to the sweeping movement of the scanning beam along the respective lines, the transverse amplitude covering all of the color zones of the respective line, while any dissymmetry of the line location relative to the lens axis within a test area, which is transmitted at a predetermined color distribution actuates a control of the circuit which adjusts field deflection. The zones relating to the three partial colors are thus not scanned in succession as formerly, but by a transversal scanning oscillation in addition to the conventional sweeping travel of the beam. This avoids the tripling of the line frequency, which is replaced by a transversally deflecting R. F. signal, f. i. by an electrical field in addition to the vertical magnetic deflection. The conventional deflection pattern of black-and-white television, including the possibility of interlaced scanning, may thus be retained. The means demanded for practicing this invention are merely of additive nature. Hence, the colored image transmitted by the method of this invention, may also be rendered without colors in a conventional black-and-white television set.

The frequency of the transversal deflection is about half the number of picture elements.

In the pickup device and in the receiver, the color component corresponding to the intermediate color zone in the testing area is preferably blacked out so only the two external zones are represented, corresponding to red and blue, respectively. Whenever the transversally deflected beam shifts off the line axis in the image-free strip, this means a longer duration of the positive or negative going alternation of the ray, depending on the direction of the shift, in the zones associated with the red or blue colors, or in the middle zone of the testing area, respectively. As a test area preferably the image edge is used, which by optical means (diaphragms) is pictured separately on the photo-mosaic. As a circuit system for generating the control signal a diode bridge circuit has proved useful, through the loading resistor of which flow two partial currrents in reverse directions, corresponding to these time durations. This bridge is controlled in push-pull by the video amplifier at the times assigned to the test area, and controlled in-phase by the auxiliary sweeping signal in charge of the transversal oscillations, which thus yields a signal dependent on the deviation of the line from true center, in order to affect the field deflection.

Line shifts that may arise are balanced off at each line only while the beam is within the test area. Instead of using on the receiving side the differential current of two photocells, as in previous methods for control purposes, a diode differential circuit is used, which is easier in design.

As an example, the accompanying drawing shows schematically possible applications of this invention.

In this figure, Fig. 1 is a circuit diagram of a transmitter to practice the method of this invention.

Figure 2:
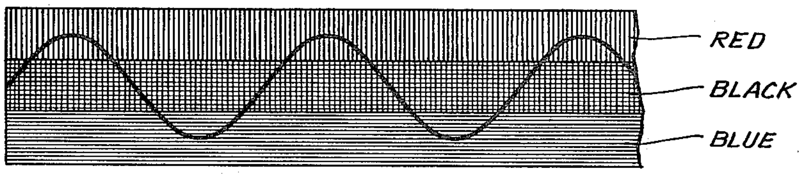
Figure 3:
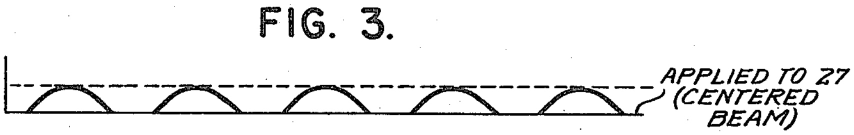
Figure 4:
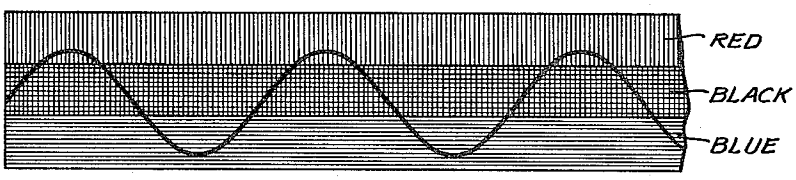
Figure 5:
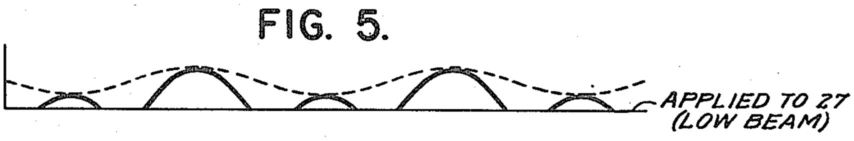
Figure 6:
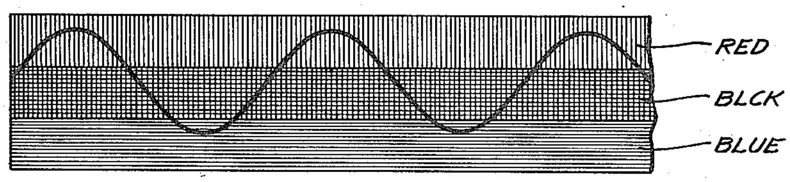
Figure 7:
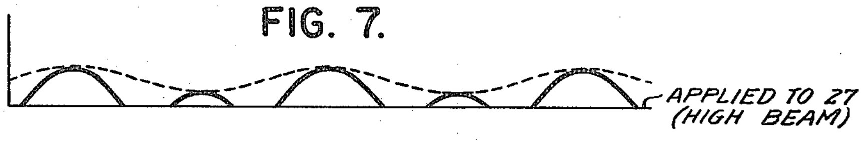

Figs. 2, 4 and 6 show the scanning line in a test area, subdivided in color zones, and Figs. 3, 5 and 7 show the current derived for correction for the conditions shown in Figs. 3, 5 and 7 respectively.

In this drawing, the object 6 is projected by the objective 7, subdivided into three colored sections red, green, and blue, onto the lens-grating 8. Each lens of the grating forms a line on the surface 9 facing target mosaic 10, having three distinct color zones. Each zone relates to a colored section of the objective 7. The color separated picture is projected onto the signal plate or mosaic and is scanned by scanning beam 11, originating from the electron gun 12.

Line scanning deflection coils are shown at 13 while coils 14 control the frame or field deflection. The line sweep generator is shown at 24, and the frame sweep generator and correction control circuit is shown at 20. Positive signal energy is applied from signal plate 10 to the video amplifier 15 and from the amplifier to the output line. At 16 is a selecting or control signal passing circuit, normally inoperative. Pulses 25 are applied to circuit 16 during the intervals of the video output energy corresponding with the periods that the sweep on the picture tube is sweeping over the test area. Circuit 16 with the aid of pulses 25 serves to blank out this test area signal from the output line and apply it to the grid of tube 27.

Output energy from tube 27 is supplied in push-pull to the diode-bridge circuit, comprising diodes 17 and 18, resistor 30 and 31, time constant circuit 32 and the secondary coil of transformer 33.

Energy from auxiliary generator 19 is applied in even phase to diodes 17 and 18 by transformer 33. It will be clear that the diode bridge circuit as shown is a typical phase discriminator circuit, the output of which is applied to the vertical sweep and control circuit 20. Auxiliary generator 19 is connected to produce, simultaneously, a transverse deflection of the line by means of deflection plates 21. The signal generated in the diode system 17, 18, affects the field deflection coils 14 by means of the field deflection circuit 20. The output energy from the circuit 16 provides a varying wave corresponding to the sweep of the cathode ray beam over the test area of the mosaic or screen as shown in Figs. 2, 4 and 6. It can readily be seen that this wave will have a component related to the frequency produced in generator 19 because of the auxiliary sweep of the beam. An output voltage of the same frequency as the generator will be produced in the diode circuit corresponding with the deviation of the beam from the center line which voltage will be stored for a limited time depending upon the time constant of circuit 32. It will be seen that if the wave applied to tube 27 corresponds with a balanced condition as shown in Fig. 2, an output corresponding with Fig. 3 will be obtained and the bias on sweep generator tube 28 will not be effected thereby, as control tube 29 will be normal. If, however, the wave deviates from the center as in Figs. 4 or 6, the balance of the rectifier bridge including rectifiers 17 and 18 will be upset by the output energy in the form shown in Figs. 5 and 7 and will produce a change in conduction of tube 29 and a correction in bias of tube 28 corresponding with the polarity and magnitude of the direct current voltage. The time constant of circuit 30 will serve to maintain this bias to retain the correction during the horizontal sweep.

In Fig. 2, 2 and 4 indicate the zones relating to the red, and blue colors, respectively. The intermediate zone 3, corresponding to the green color, is masked out and remains dark. The path of the scanning beam, shown at 5 is symmetrical to the line axis, as is evident from the diagram. In this case, no additional signal is fed into the vertical deflection coils 14, as the resulting alternating signal (Fig. 3) is symmetrical and pulses of uniform amplitude will be present in the output of the tube. If, however, the oscillations of the scanning beam 5 are off-center as shown in Fig. 4, the alternating signal, fed into the diode system 17, 18, provides a resultant voltage and the set of field coils 14 is provided with a corresponding additional signal, which shifts the scanning beam relative to the line axis, until the balance is restored.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. A color television system comprising a cathode ray tube having means for producing an image separated into different color component zones out of alignment with each other in a direction along each scanning line thereof, means for producing a cathode ray beam, line and frame sweep control means for scanning said cathode ray beam over said image means, auxiliary beam control means for applying a beam control effect to move said beam to said different color component zones about a horizontal line symmetrically located with respect to two non-adjacent color component zones a plurality of times during each scanning, a test area arranged in the path of said beam having separate portions corresponding to the position of said two non-adjacent zones of said image, the area between said non-adjacent portions responding differently to the beam than the corresponding portion outside of said test area, means for deriving scanning correction energy in response to deviation of said beam from said predetermined scanning line while sweeping over said test area, and means for applying said scanning correction energy to said frame sweep control means.

2. A color television system according to claim 1, wherein said zones comprise adjacent linear areas.

3. A color television system according to claim 2, wherein said auxiliary means comprises an alternating generator, and deflection means coupled to said generator.

4. A color television system according to claim 3, wherein said means for deriving scanning-correction-energy comprises means for combining energy from said generator and energy derived from said beam scanning said correction area.

References Cited in the file of this patent

UNITED STATES PATENTS

| Number | Name | Date |
|---|---|---|
| 2,143,933 | Barthelemy | Jan. 17, 1939 |
| 2,222,934 | Blumlein | Nov. 26, 1940 |
| 2,415,059 | Zworykin | Jan. 25, 1947 |
| 2,458,291 | Munster | Jan. 4, 1949 |
| 2,490,812 | Huffman | Dec. 13, 1949 |
| 2,530,431 | Huffman | Nov. 21, 1950 |
| 2,611,816 | Darke | Sept. 23, 1952 |